(12) United States Patent
Katrak et al.

(10) Patent No.: US 8,103,946 B2
(45) Date of Patent: Jan. 24, 2012

(54) SECURE DATA STRATEGY FOR VEHICLE CONTROL SYSTEMS

(75) Inventors: Kerfegar K. Katrak, Fenton, MI (US); James K. Thomas, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1285 days.

(21) Appl. No.: 11/750,351

(22) Filed: May 18, 2007

(65) Prior Publication Data
US 2008/0288135 A1 Nov. 20, 2008

(51) Int. Cl.
*G06F 11/10* (2006.01)
*G01M 17/00* (2006.01)
(52) U.S. Cl. .......................... 714/807; 701/29
(58) Field of Classification Search .............. 714/48–49, 714/746, 799, 807; 701/29, 31, 33
See application file for complete search history.

(56) References Cited

U.S. PATENT DOCUMENTS

| | | | | |
|---|---|---|---|---|
| 4,498,177 | A * | 2/1985 | Larson | 714/806 |
| 6,891,897 | B1 * | 5/2005 | Bevan et al. | 375/265 |
| 2006/0173942 | A1 | 8/2006 | Katrak | |

\* cited by examiner

*Primary Examiner* — Shelly A Chase
(74) *Attorney, Agent, or Firm* — Ingrassia Fisher & Lorenz, P.C.

(57) ABSTRACT

A method of providing secure data from vehicle operational variable data that includes a plurality of data message bits includes the steps of dividing the plurality of data message bits into a first group of data message bits and a second group of data message bits, encoding the first group of data message bits using a data map to generate a plurality of encoded data message bits, and generating the data message from the plurality of encoded data message bits and the second group of data message bits.

27 Claims, 7 Drawing Sheets

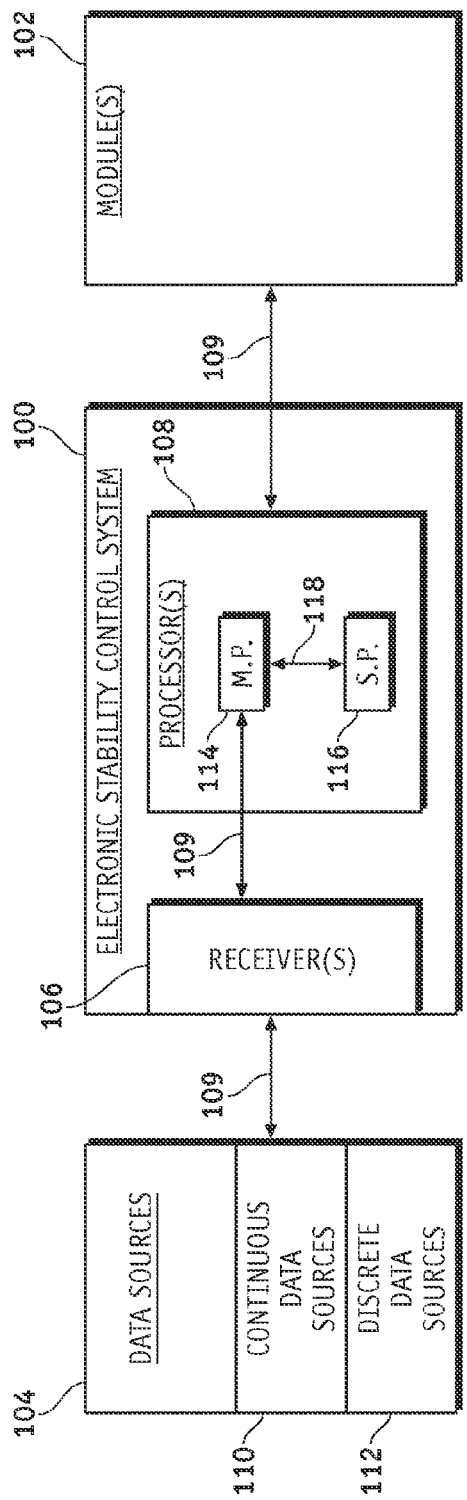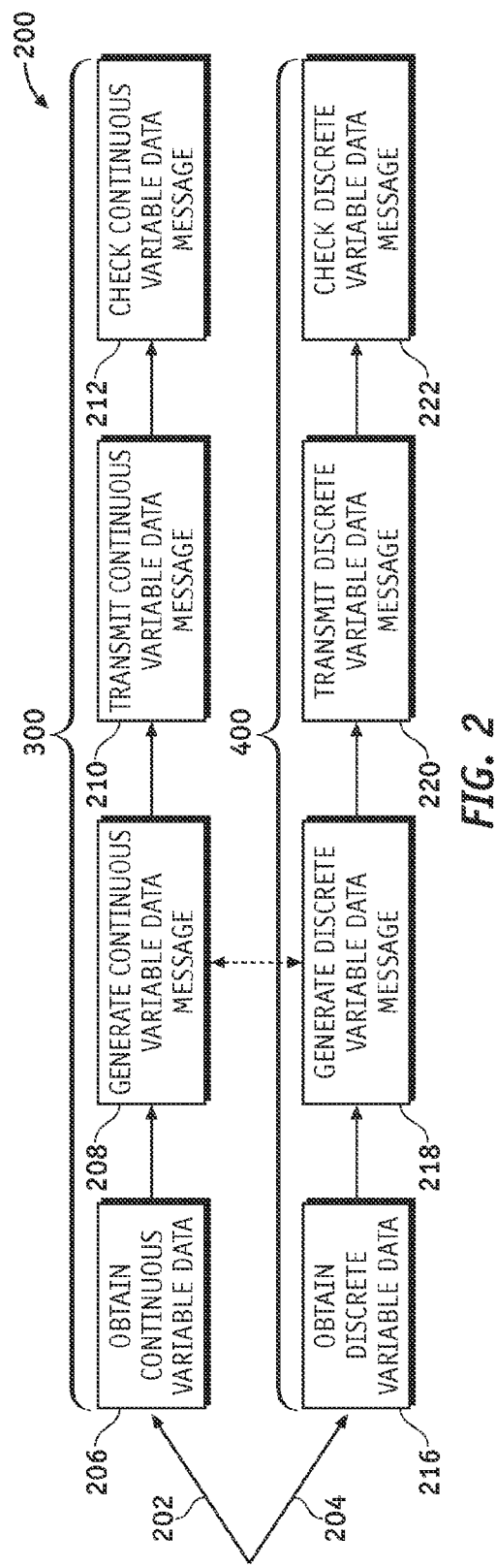

| 1 BIT ORIGINAL DECIMAL VALUE (308) | | 2 BIT OPTIMIZED DECIMAL VALUE (320) |
|---|---|---|
| 0 | = | 1 |
| 1 | = | 2 |

318(A)(2): 318(A)

| 1 BIT ORIGINAL DECIMAL VALUE (308) | | 2 BIT OPTIMIZED DECIMAL VALUE (320) |
|---|---|---|
| 0 | = | 0 |
| 1 | = | 3 |

| 2 BIT ORIGINAL DECIMAL VALUE (308) | | 3 BIT OPTIMIZED DECIMAL VALUE (320) |
|---|---|---|
| 3 | = | 2 |
| 1 | = | 4 |
| 2 | = | 1 |
| 0 | = | 7 |

318(B)(2): 318(B)

| 2 BIT ORIGINAL DECIMAL VALUE (308) | | 3 BIT OPTIMIZED DECIMAL VALUE (320) |
|---|---|---|
| 3 | = | 5 |
| 2 | = | 3 |
| 1 | = | 6 |
| 0 | = | 0 |

| 3 BIT ORIGINAL DECIMAL VALUE (308) | | 4 BIT OPTIMIZED DECIMAL VALUE (320) |
|---|---|---|
| 7 | = | 4 |
| 6 | = | 11 |
| 5 | = | 2 |
| 4 | = | 13 |
| 2 | = | 8 |
| 3 | = | 7 |
| 1 | = | 1 |
| 0 | = | 14 |

318(C)(2): 318(C)

| 3 BIT ORIGINAL DECIMAL VALUE (308) | | 4 BIT OPTIMIZED DECIMAL VALUE (320) |
|---|---|---|
| 7 | = | 5 |
| 6 | = | 10 |
| 5 | = | 9 |
| 4 | = | 6 |
| 2 | = | 12 |
| 3 | = | 3 |
| 1 | = | 0 |
| 0 | = | 15 |

318(D)(1)

| 4 BIT ORIGINAL DECIMAL VALUE | | 5 BIT OPTIMIZED DECIMAL VALUE |
|---|---|---|
| 15 | = | 10 |
| 12 | = | 20 |
| 13 | = | 9 |
| 11 | = | 18 |
| 14 | = | 5 |
| 9 | = | 12 |
| 10 | = | 6 |
| 8 | = | 27 |
| 5 | = | 23 |
| 7 | = | 17 |
| 6 | = | 29 |
| 4 | = | 3 |
| 3 | = | 24 |
| 1 | = | 15 |
| 2 | = | 30 |
| 0 | = | 0 |

318(D)(2)

| 4 BIT ORIGINAL DECIMAL VALUE | | 5 BIT OPTIMIZED DECIMAL VALUE |
|---|---|---|
| 15 | = | 21 |
| 13 | = | 11 |
| 11 | = | 22 |
| 14 | = | 13 |
| 12 | = | 26 |
| 9 | = | 19 |
| 10 | = | 25 |
| 8 | = | 4 |
| 5 | = | 8 |
| 7 | = | 14 |
| 6 | = | 2 |
| 4 | = | 7 |
| 3 | = | 28 |
| 1 | = | 16 |
| 2 | = | 1 |
| 0 | = | 31 |

| 5 BIT ORIGINAL DECIMAL VALUE | | 6 BIT OPTIMIZED DECIMAL VALUE |
|---|---|---|
| 31 | = | 42 |
| 30 | = | 21 |
| 29 | = | 41 |
| 28 | = | 22 |
| 27 | = | 37 |
| 26 | = | 26 |
| 25 | = | 44 |
| 24 | = | 52 |
| 23 | = | 25 |
| 22 | = | 19 |
| 20 | = | 50 |
| 21 | = | 38 |
| 19 | = | 11 |
| 18 | = | 13 |
| 17 | = | 28 |
| 16 | = | 49 |
| 15 | = | 35 |
| 14 | = | 14 |
| 13 | = | 8 |
| 12 | = | 55 |
| 11 | = | 4 |
| 10 | = | 59 |
| 9 | = | 56 |
| 8 | = | 7 |
| 5 | = | 16 |
| 4 | = | 47 |
| 7 | = | 2 |
| 6 | = | 61 |
| 3 | = | 32 |
| 2 | = | 31 |
| 1 | = | 1 |
| 0 | = | 62 |

318(E)(1)

| 5 BIT ORIGINAL DECIMAL VALUE | | 6 BIT OPTIMIZED DECIMAL VALUE |
|---|---|---|
| 31 | = | 20 |
| 30 | = | 43 |
| 29 | = | 18 |
| 28 | = | 45 |
| 27 | = | 10 |
| 26 | = | 53 |
| 25 | = | 36 |
| 24 | = | 27 |
| 23 | = | 9 |
| 22 | = | 54 |
| 20 | = | 51 |
| 21 | = | 12 |
| 19 | = | 40 |
| 18 | = | 23 |
| 17 | = | 17 |
| 16 | = | 46 |
| 15 | = | 34 |
| 14 | = | 29 |
| 13 | = | 5 |
| 12 | = | 58 |
| 11 | = | 24 |
| 10 | = | 39 |
| 9 | = | 57 |
| 8 | = | 6 |
| 5 | = | 48 |
| 4 | = | 15 |
| 7 | = | 33 |
| 6 | = | 30 |
| 3 | = | 3 |
| 2 | = | 60 |
| 1 | = | 0 |
| 0 | = | 63 |

INERTIAL SENSORS — 412
- Yaw RATE 1
- Yaw RATE 2

428(A)

| Yaw 1 AND Yaw 2 STATUS | | ENCODED VALUES |
|---|---|---|
| Yaw RATE 1 INVALID & Yaw RATE 2 INVALID | = | 0 |
| Yaw RATE 1 INVALID & Yaw RATE 2 VALID | = | 3 |
| Yaw RATE 1 VALID & Yaw RATE 2 VALID | = | 5 |
| Yaw RATE 1 VALID & Yaw RATE 2 INVALID | = | 6 |

420, 424 — 430

NON-MAP VALUES — 442
1, 2, 4, 7

| Yaw 1 AND Yaw 2 AVAILABILITY | | ENCODED VALUES |
|---|---|---|
| Yaw RATE 1 TEMPORARILY UNAVAILABLE & Yaw RATE 2 TEMPORARILY UNAVAILABLE | = | 0 |
| Yaw RATE 1 AVAILABLE & Yaw RATE 2 TEMPORARILY UNAVAILABLE | = | 3 |
| Yaw RATE 1 AVAILABLE & Yaw RATE 2 AVAILABLE | = | 5 |
| Yaw RATE 1 TEMPORARILY UNAVAILABLE & Yaw RATE 2 AVAILABLE | = | 6 |

420, 424 — 430

NON-MAP VALUES — 442
1, 2, 4, 7

SECURE DATA STRATEGY FOR VEHICLE CONTROL SYSTEMS

TECHNICAL FIELD

The present invention generally relates to control systems installed in automobiles and other vehicles, and more particularly relates to methods and systems for ensuring the security of data processed within a vehicle-based control system.

BACKGROUND OF THE INVENTION

Modern automobiles and other vehicles may include sophisticated on-board computer systems that monitor the status and performance of various components of the vehicle (for example, the vehicle engine, transmission, brakes, suspension, and/or other components of the vehicle). Many of these computer systems may also adjust or control one or more operating parameters of the vehicle in response to operator instructions, road or weather conditions, operating status of the vehicle, and/or other stimuli.

Various types of microcontroller or microprocessor-based controllers installed in many conventional vehicles include supervisory control modules (SCMs), engine control modules (ECMs), and controllers for various vehicle components (for example, anti-lock brakes, electronically-controlled transmissions, or other components), among other modules. Such controllers may receive data from one or more sensors or other sources, process the data to generate suitable output signals, and provide the output signals to actuators, dashboard indicators and/or other data responders, as appropriate. The various components of a vehicle-based control system typically communicate with each other and/or with sensors and/or actuators across serial and/or parallel data links. Today, data processing components within a vehicle are commonly interlinked by a data communications network such as a Controller Area Network (CAN), an example of which is described in ISO Standard 11898-1 (2003).

Because vehicles may now process relatively large amounts of digital data during operation, it can be an engineering challenge to ensure that the processed data is accurate and reliable. As digital data is stored, processed, consumed and/or shared between or within the various data processing components of a vehicle, for example, bit errors and the like can occur due to environmental factors, hardware faults, data transmission errors, and other causes. As a result, various techniques have been developed to ensure the integrity of data processed and transferred within the vehicle. However, because there may be limited space in a system for the transmission of serial data messages at any particular time, there is a need for securing data messages while reducing data message size and/or the number of data messages.

It remains desirable to formulate systems and methods for ensuring data message security within vehicle control systems while reducing data message size and/or the number of data messages transmitted within or between vehicle systems. Other desirable features and characteristics will become apparent from the subsequent detailed description and the appended claims, taken in conjunction with the accompanying drawings and the foregoing technical field and background.

SUMMARY OF THE INVENTION

A method is provided of providing secure data from vehicle operational variable data that includes a plurality of data message bits. In one embodiment, and by way of example only, the method comprises the steps of dividing the plurality of data message bits into a first group of data message bits and a second group of data message bits, encoding the first group of data message bits to generate a plurality of encoded data message bits, and generating the data message from the plurality of encoded data message bits and the second group of data message bits.

In another embodiment, and by way of example only, the vehicle operational variable data comprises a first plurality of data message bits representative of a first vehicle parameter and a second plurality of data message bits representative of a second vehicle parameter, and the method comprises the steps of determining a condition state for the first vehicle parameter, based at least in part on the first plurality of data message bits, determining a condition state for the second vehicle parameter, based at least in part on the second plurality of data message bits, determining a combined condition state for the first and second vehicle parameters, based at least in part on the first condition state and the second condition state, and assigning an encoded value to the combined condition state, based at least in part on a data map.

An apparatus is provided for a vehicle control system. In one embodiment, and by way of example only, the vehicle control system comprises a receiver and a processor. The receiver is configured to receive a plurality of data bits of vehicle operational data from a data source. The processor is in operable communication with the receiver, and is configured to select a plurality of data message bits from the plurality of data bits for inclusion in a data message, divide the plurality of data message bits into a first group of data message bits and a second group of data message bits, encode the first group of data message bits using a data map to generate a plurality of encoded data message bits, and generate the data message from the plurality of encoded data message bits and the second group of data message bits.

In another embodiment, and by way of example only, the receiver is configured to receive a plurality of groups of data message bits, each group of data message bits representing values for a corresponding vehicle parameter. The processor is in operable communication with the receiver, and is configured to determine a condition state for each vehicle parameter, based at least in part on the corresponding group of data message bits for such vehicle parameter, determine a combined condition state for two or more of the vehicle parameters, based at least in part on the determined condition states for such vehicle parameters, assign an encoded value for each combined condition state, based at least in part on a data map, and generate a data message, based at least in part on the encoded values.

DESCRIPTION OF THE DRAWINGS

The present invention will hereinafter be described in conjunction with the following drawing figures, wherein like numerals denote like elements, and FIG. 1 is a functional block diagram of an embodiment of a vehicle control system for controlling one or more vehicle modules based on data received from a plurality of sources;

FIG. 2 is a flowchart of an embodiment of a combined process for securing vehicle operational variable data including both continuous variable data values and discrete variable data values, which can be implemented using the vehicle control system of FIG. 1;

FIGS. 5A-5E are charts showing exemplary data maps that can be used for encoding data message bits in the processes of FIGS. 2-4; and FIG. 6A-6B are charts showing exemplary implementations of an exemplary data map in the process of FIG. 4.

DESCRIPTION OF AN EXEMPLARY EMBODIMENT

Figure 3:
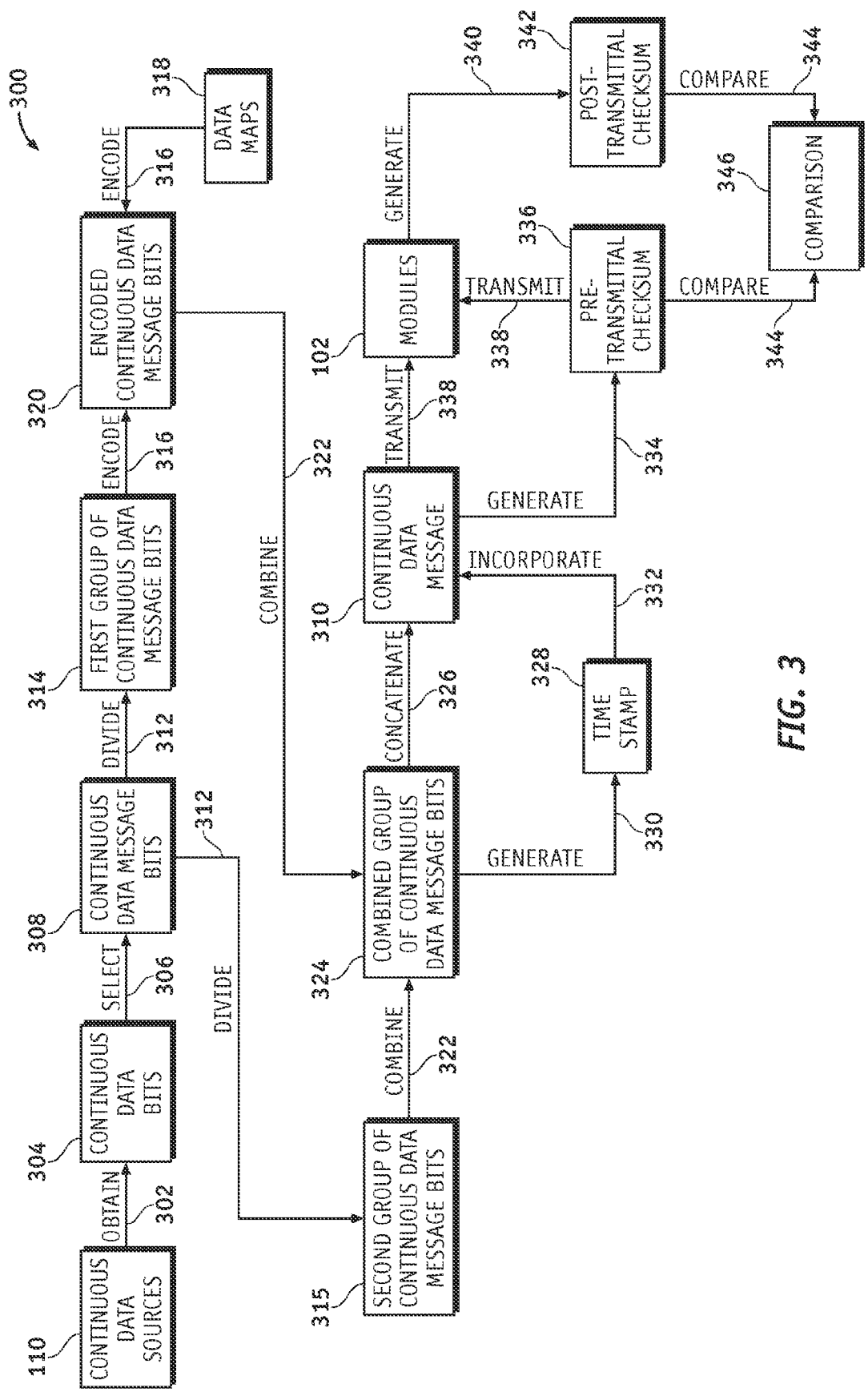
FIG. 3 is a flowchart of an embodiment of a process for securing continuous variable vehicle operational variable data that can be used in the process of FIG. 2.

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

FIG. 1 is a functional block diagram of an exemplary vehicle control system 100 for controlling operation of one or more vehicle modules 102 based on data received from a plurality of data sources 104. The vehicle control system 100 includes one or more receivers 106 and one or more processors 108.

The receivers 106 are in operable communication with the data sources 104 and the processors 108. Specifically, the receivers 106 receive various data values from the data sources 104 and provide the data values to the processors 108 for processing. The receivers 106 communicate with the data sources 104 and the processors 108 via one or more interfaces 109. Such interfaces 109 may include, by way of example only, various types of serial, parallel, wireless or other data communication connections, such as a Serial Peripheral Interface (SPI) connection.

It will be appreciated that the receivers 106 may receive and utilize both continuous variable data and discrete variable data, for example from various types of continuous variable data sources 110 and discrete variable data sources 112, respectively. Alternatively, the receivers 106 may instead receive only continuous variable data or discrete variable data from the data sources 104, or may receive both continuous variable data and discrete variable data from one or more common data sources 104. Regardless, the receivers 106 receive various data message bits from the data sources 104.

The processors 108 are in operable communication with the receivers 106 and the modules 102, preferably via one or more interfaces 109 of the types discussed above. The processors 108 are configured to analyze the data values received from the receivers 106, perform various comparisons thereof and manipulations thereon, generate data messages therefrom, transmit the data messages, and perform various cross-checks pertaining thereto. For example, the processors 108 preferably perform the following tasks: selecting data message bits for inclusion in the data messages, determining which data message bits require heightened validation, encoding the data message bits requiring heightened validation using one or more data maps, concatenating groups of data bits together, generating pre-transmittal cross-check measures for the data messages, determining condition states for various vehicle parameters based on the data values, determining combined condition state values for various groups of vehicle parameters, prioritizing the combined condition states, assigning encoded values for various combined condition states, and performing various other steps of the various processes 200, 300, and 400 that will be described further below in connection with FIGS. 2-4. The processors 108 may additionally monitor the operation of the data sources 104, determine whether specific data sources 104 are operating correctly, selectively control the modules 102 based at least in part on data from the data sources 104 and the analysis and manipulations pertaining thereto, and/or perform various other functions.

Preferably the processors 108 include one or more main processors 114 for communication with the receivers 106 and modules 102, and one or more sub-processors 116 for performing back-up calculations and/or monitoring performance of the main processor 114. Such main processors 114 and sub-processors 116 are preferably interconnected by a conventional data connection 118 as appropriate. The data connection 118 may include a UART or other internal connection (e.g. a bus connection) within the vehicle control system 100, and/or another type of connection. The number, type, and configuration of the processors 108 may vary.

It will be appreciated that the structure of the vehicle control system 100 may vary, and may include various other different types of receivers 106, processors 108, and/or other components. It will similarly be appreciated that one or more of the data sources 104, modules 102, components thereof, and/or other types of devices or sub-systems may also be included as part of the vehicle control system 100, and/or that various other features of the vehicle control system 100 may vary.

The data sources 104 may include sensors, actuators, indicators, or other components (not depicted), each measuring data values of at least one variable relevant to the operation of the vehicle control system 100. Each data source 104 may also include one or more non-depicted processors, or may use one or more of the processors 108 of the vehicle control system 100, and/or various other processors, devices, or systems, to measure, provide, determine, and/or check the data values. Similarly, as noted above, various data sources 104, or portions thereof, may be part of the vehicle control system 100, or vice versa.

The modules 102 may include various vehicle modules, devices, or systems. Some non-limiting examples include the vehicle engine, transmission, brakes, suspension, and/or other components of the vehicle or combinations thereof. The processors 108 may control the operation of the modules 102 in whole or in part, either directly or indirectly via interfaces 109, devices, or systems, which may be a part of, and/or communicate with, the vehicle control system 100 and/or one or more of the modules 102.

Turning now to FIG. 2 a combined process 200 is depicted for securing vehicle operational variable data including both continuous variable data values and discrete variable data values. In the depicted embodiment, the combined process 200 includes various steps along a first path 202 pertaining to continuous variable data values and a second path 204 pertaining to discrete variable data values. Preferably the steps of the first path 202 and the second path 204 are conducted simultaneously or at least substantially concurrently; however, the first and second paths 202, 204 will be discussed sequentially below for ease of reference.

Proceeding first with the first path 202, in step 206 continuous variable data is obtained, preferably by the receivers 106 from the continuous variable data sources 110. In step 208, one or more continuous variable data messages are generated using the continuous variable data. In step 210, the continuous variable data messages are transmitted, preferably by the processors 108 to one or more of the modules 102. However, it will be appreciated that this may vary, for example, in that the continuous data messages may instead be transmitted by various types of transmitting devices, and/or may be received by various types of receiving devices. Next, in step 212, one or more cross-checks are conducted pertaining to the continuous variable data messages. The combined steps 206-212 will hereafter be referenced collectively as the continuous variable process 300 depicted in FIG. 3 and discussed further below in connection therewith.

Meanwhile, in the second path 204, in step 216 discrete variable data is similarly obtained, preferably by the receivers 106 from the discrete variable data sources 112. One or more discrete variable data messages are then generated in step 218 using the discrete variable data. The discrete variable data messages are transmitted in step 220, preferably by the processors 108 to one or more of the modules 102. However, similar to the first path 202 described above, it will be appreciated that this may also vary in the second path 204, for example, in that the discrete data messages may instead be transmitted by various types of transmitting devices, and/or may be received by various types of receiving devices. Next, in step 222, one or more cross-checks are conducted pertaining to the discrete variable data messages. The combined steps 216-222 will hereafter be referenced collectively as the discrete variable process 400 depicted in FIG. 4 and discussed further below in connection therewith.

The continuous variable process 300 and the discrete variable process 400 may be conducted in concert with one another or independently from one another and, as noted above, may be conducted simultaneously or in either order. Specifically, the continuous variable process 300 may be conducted without the discrete variable process 400, and vice versa. Alternatively, the continuous variable process 300 and the discrete variable process 400 may be both conducted together in generating, transmitting, and/or checking separate messages, each representing only one type of variable information (continuous or discrete), and/or in generating, transmitting, and/or checking combined messages having both a continuous variable component and a discrete variable component. As shown in the dotted line in FIG. 2 connecting steps 208 and 218, in certain embodiments continuous and discrete variable message components, rather than entire messages, may be generated in steps 208 and 218, respectively, and may be combined at any time to generate such a combined message featuring both continuous and discrete variable components.

Turning now to FIG. 3, the continuous variable process 300 is depicted in greater detail. First, in step 302, a plurality of continuous data bits 304 are obtained, preferably by the receivers 106 from the continuous variable data sources 110. Next, in step 306, the processors 108 select a plurality of continuous data message bits 308 from the continuous data bits 304 for ultimate inclusion in one or more continuous data messages 310. For example, if the continuous variable data values pertain to yaw, lateral acceleration, longitudinal acceleration, and/or other numeric values, then certain continuous data bits 304 that directly measure such numeric values may be selected as continuous data message bits 308, while other continuous data bits 304 that only indirectly measure such numeric values, and/or that represent certain calculations or other indirect information pertaining thereto, may not be selected as continuous data message bits 308. This selection in step 306 can thereby reduce the number and/or size of the continuous data messages 310 transmitted in the vehicle control system 100, to thereby reduce data message traffic and/or otherwise improve performance of the vehicle control system 100.

Next, in step 312, the processors 108 divide the continuous data message bits 308 into a first group 314 of continuous data message bits 308 requiring heightened validation and a second group 315 of continuous data message bits 308 not requiring heightened validation. For example, certain continuous data message bits 308 may require heightened validation if they represent variables having only a single source of values, are not validated via other means, and/or are of particular importance for vehicle operation and safety. Other continuous data message bits 308 may not require heightened validation if they represent variables having multiple sources of values, are already validated via other means, and/or are of relatively less importance for vehicle safety. Similar to step 306, this division of the continuous data message bits 308 in step 312 can further reduce the number and/or size of the continuous data messages 310 transmitted in the vehicle control system 100, to thereby reduce data message traffic and/or otherwise improve performance of the vehicle control system 100.

The processors 108 then encode, in step 316, the first group 314 of continuous data message bits 308 using one or more data maps 318, thereby generating a plurality of encoded continuous data message bits 320. Preferably, step 316 is conducted using one or more Karnaugh maps, such as those depicted in FIGS. 5A-5E. The specific data maps 318 used will be dependent on the number of bits represented in the first group 314. Preferably, the number of encoded continuous data message bits 320 is one bit greater than the number of bits represented in the first group 314, as will be demonstrated below in connection with FIGS. 5A-5E. In addition, the possible values for each sequence of encoded continuous data message bits 320 for a particular data map 318 are preferably at least two bit errors removed from one another, as will also be demonstrated below in connection with FIGS. 5A-5E, so as to provide enhanced security and prevent memory fault errors.

For example, as shown in FIG. 5A, if the first group 314 includes values representing a single bit at a time (namely a zero or a one), then a two-bit value of encoded continuous data message bits 320 is generated, using one of the alternative data maps 318(A)(1) or 318(A)(2) depicted in FIG. 5A. Specifically, using the first data map 318(A)(1), each first group 314 one-bit value of zero (0 in binary form) is assigned a two-bit encoded value of one (01 in binary form), while each first group 314 one-bit value of one (1 in binary form) is assigned a two-bit value of two (10 in binary form). Alternatively, using the second data map 318(A)(2), each first group 314 one-bit value of zero (0 in binary form) is assigned a two-bit encoded value of zero (00 in binary form), while each first group 314 one-bit value of one (1 in binary form) is assigned a two-bit value of three (11 in binary form). Thus, in both data maps 318(A)(1) and 318(A)(2), the possible sequences of encoded continuous data message bits 320 are at least two bit errors removed from one another.

With reference to FIG. 5B, if the first group 314 includes values representing two bits at a time (with possible values ranging from 0 to 3), then a three-bit value of encoded continuous data message bits 320 is generated (with possible values ranging from 0 to 7), using one of the alternative data maps 318(B)(1) or 318(B)(2) depicted in FIG. 5B. Specifically, using the first data map 318(B)(1), each first group 314 two-bit value of zero (00 in binary form) is assigned a three-bit encoded value of seven (111 in binary form), each first group 314 two-bit value of one (01 in binary form) is assigned a three-bit value of four (100 in binary form), each first group 314 two-bit value of two (10 in binary form) is assigned a three-bit value of one (001 in binary form), and each first group 314 two-bit value of three (11 in binary form) is assigned a three-bit value of two (010 in binary form). Alternatively, using the second data map 318(B)(2), each first group 314 two-bit value of zero (00 in binary form) is assigned a three-bit encoded value of zero (000 in binary form), each first group 314 two-bit value of one (01 in binary form) is assigned a three-bit value of six (110 in binary form), each first group 314 two-bit value of two (10 in binary form) is assigned a three-bit value of three (011 in binary form), and each first group 314 two-bit value of three (11 in binary form) is assigned a three-bit value of five (101 in binary form). Thus, in both data maps 318(B)(1) and 318(B)(2), the possible sequences of encoded continuous data message bits 320 are at least two bit errors removed from one another.

Turning now to FIG. 5C, if the first group 314 includes values representing three bits at a time (with possible values ranging from 0 to 7), then a four-bit value of encoded continuous data message bits 320 is generated (with possible values ranging from 0 to 15), using one of the alternative data maps 318(C)(1) or 318(C)(2) depicted in FIG. 5C. Specifically, using the first data map 318(C)(1), each first group 314 three-bit value of zero (000 in binary form) is assigned a four-bit encoded value of fourteen (1110 in binary form), each first group 314 three-bit value of one (001 in binary form) is assigned a four-bit value of one (0001 in binary form), each first group 314 three-bit value of two (0010 in binary form) is assigned a four-bit value of eight (1000) in binary form), each first group 314 three-bit value of three (011 in binary form) is assigned a four-bit value of seven (0111 in binary form), each first group 314 three-bit value of four (100 in binary form) is assigned a four-bit value of thirteen (1101 in binary form), each first group 314 three-bit value of five (101 in binary form) is assigned a four-bit value of two (0010 in binary form), each first group 314 three-bit value of six (110 in binary form) is assigned a four-bit value of eleven (1011 in binary form), and each first group 314 three-bit value of seven (111 in binary form) is assigned a four-bit value of four (0100 in binary form). Alternatively, using the second data map 318(C)(2), each first group 314 three-bit value of zero (000 in binary form) is assigned a four-bit encoded value of fifteen (1111 in binary form), each first group 314 three-bit value of one (001 in binary form) is assigned a four-bit value of zero (0000 in binary form), each first group 314 three-bit value of two (0010 in binary form) is assigned a four-bit value of twelve (1100) in binary form), each first group 314 three-bit value of three (011 in binary form) is assigned a four-bit value of three (0011 in binary form), each first group 314 three-bit value of four (100 in binary form) is assigned a four-bit value of six (0110 in binary form), each first group 314 three-bit value of five (101 in binary form) is assigned a four-bit value of nine (1001 in binary form), each first group 314 three-bit value of six (110 in binary form) is assigned a four-bit value of ten (1010 in binary form), and each first group 314 three-bit value of seven (111 in binary form) is assigned a four-bit value of five (0101 in binary form). Thus, in both data maps 318(C)(1) and 318(C)(2), the possible sequences of encoded continuous data message bits 320 are at least two bit errors removed from one another.

Similarly, FIG. 5D shows alternative data maps 318(D)(1) and 318(D)(2) for converting first group 314 values representing four bits at a time, while FIG. 5E shows alternative data maps 318(E)(1) and 318(E)(2) for converting first group 314 values representing five bits at a time. Under each of these maps, the possible sequences of encoded continuous data message bits 320 are at least two bit errors removed from one another. It will be appreciated that various combinations of these and/or other data maps 318 can be used in the continuous variable process 300 in converting various numbers of different bits at a time.

It will similarly be appreciated that the first group 314 can be broken into different sub-groups of various sizes prior to utilizing the data maps 318. For example, if the first group 314 includes values representing more than five bits at a time, then the first group 314 can be broken up into smaller sub-groups, and a different combination of the data maps 318 of FIGS. 5A-5E, and/or other data maps 318, can be used separately on the smaller sub-groups. By way of example only, if the first group 314 includes values representing six bits at a time, then the first group 314 can be divided into (i) two sub-groups of three bits each (each encoded using a data map 318 from FIG. 5C); (ii) three sub-groups of two bits each (each encoded using a data map 318 from FIG. 5B); (iii) six sub-groups of one bit each (each encoded using a data map 318 from FIG. 5A); (iv) a sub-group of four bits (encoded using a data map 318 from FIG. 5D) and a sub-group of two bits (encoded using a data map 318 from FIG. 5B); (v) a sub-group of five bits (encoded using a data map 318 from FIG. 5E) and a sub-group of one bit (encoded using a data map 318 from FIG. 5A); (vi) a sub-group of four bits (encoded using a data map 318 from FIG. 5D) and two sub-groups of one bit each (each encoded using a data map 318 from FIG. 5A); (vii) a sub-group of three bits (encoded using a data map 318 from FIG. 5C), a sub-group of two bits (encoded using a data map 318 from FIG. 5B), and a sub-group of one bit (encoded using a data map 318 from FIG. 5A); (viii) a sub-group of three bits (encoded using a data map 318 from FIG. 5C) and three sub-groups of one bit each (each encoded using a data map 318 from FIG. 5A); or (ix) a sub-group of two bits (encoded using a data map 318 from FIG. 5B) and four sub-groups of one bit each (each encoded using a data map 318 from FIG. 5A). Similarly, various different combinations of sub-groups can be used, with corresponding data maps 318 for each sub-group based on the number of bits, for a first group 314 representing various numbers of different bits at a time.

Returning now to FIG. 3, after the first group 314 of continuous data message bits 308 is encoded, the encoded continuous data message bits 320 are then combined with the second group 315 of continuous data message bits 308 in step 322, thereby generating a combined group 324 of continuous data message bits 308. The processors 108 then, in step 326, concatenate the combined group 324 of continuous data message bits 308, thereby forming the continuous data message 310. The continuous data message 310 therefore includes encoded values for continuous data message bits 308 requiring heightened validation, combined with original values for continuous data message bits 308 not requiring heightened validation, thereby potentially saving message size. For variable values which are time sensitive, the continuous data message 310 may also include a time stamp 328, generated by the processors 108 in step 330 and incorporated into the continuous data message 310 in step 332. The time stamp 328 may be an absolute or real-time stamp, or may be one of various types of relative time stamps known in the art.

Next, in step 334, a pre-transmittal checksum 336 is optionally generated. If necessary, such a pre-transmittal checksum 336 may include various different types of checksums or other cross-checks known in the art. "Checksum" in this case, and referenced throughout this application, can refer to various types of parity, cyclic redundancy code (CRC), digest, or other techniques for representing the contents of the transmittal message or portions thereof. As noted above, a pre-transmittal checksum 336 may not be necessary in all situations.

The continuous data message 310 is then transmitted in step 338 to the modules 102, preferably for operation of such modules 102. In addition, if a pre-transmittal checksum 336 was generated in step 334, then such pre-transmittal checksum 336 is also preferably transmitted to the modules 102 in step 338. However, it will be appreciated that the pre-transmittal checksum 336 may instead by separately transmitted to the modules 102 in a different step, or, as noted above, may not be necessary in certain instances. The modules 102 may, in step 340, generate a post-transmittal checksum 342 based on the contents of the continuous data message 310 received by the modules 102. Similar to the pre-transmittal checksum 336, the post-transmittal checksum 342 may include various different types of checksums or other cross-checks known in the art. The post-transmittal checksum 342 is then compared, in step 344, with the pre-transmittal checksum 336, thereby generating a comparison 346 therebetween. The comparison 346 can be used, for example, to check for accuracy in the transmission process in step 338.

It will be appreciated that various steps of the continuous variable process 300 may vary from that depicted in FIG. 3 and described above. It will similarly be appreciated that various steps of the continuous variable process 300 may be conducted simultaneously or in a different order than depicted in FIG. 3, and/or that various steps of the continuous variable process 300 may be conducted simultaneously and/or in conjunction with various steps of the discrete variable process 400 depicted in FIG. 4 and described below in connection therewith.

Figure 4:
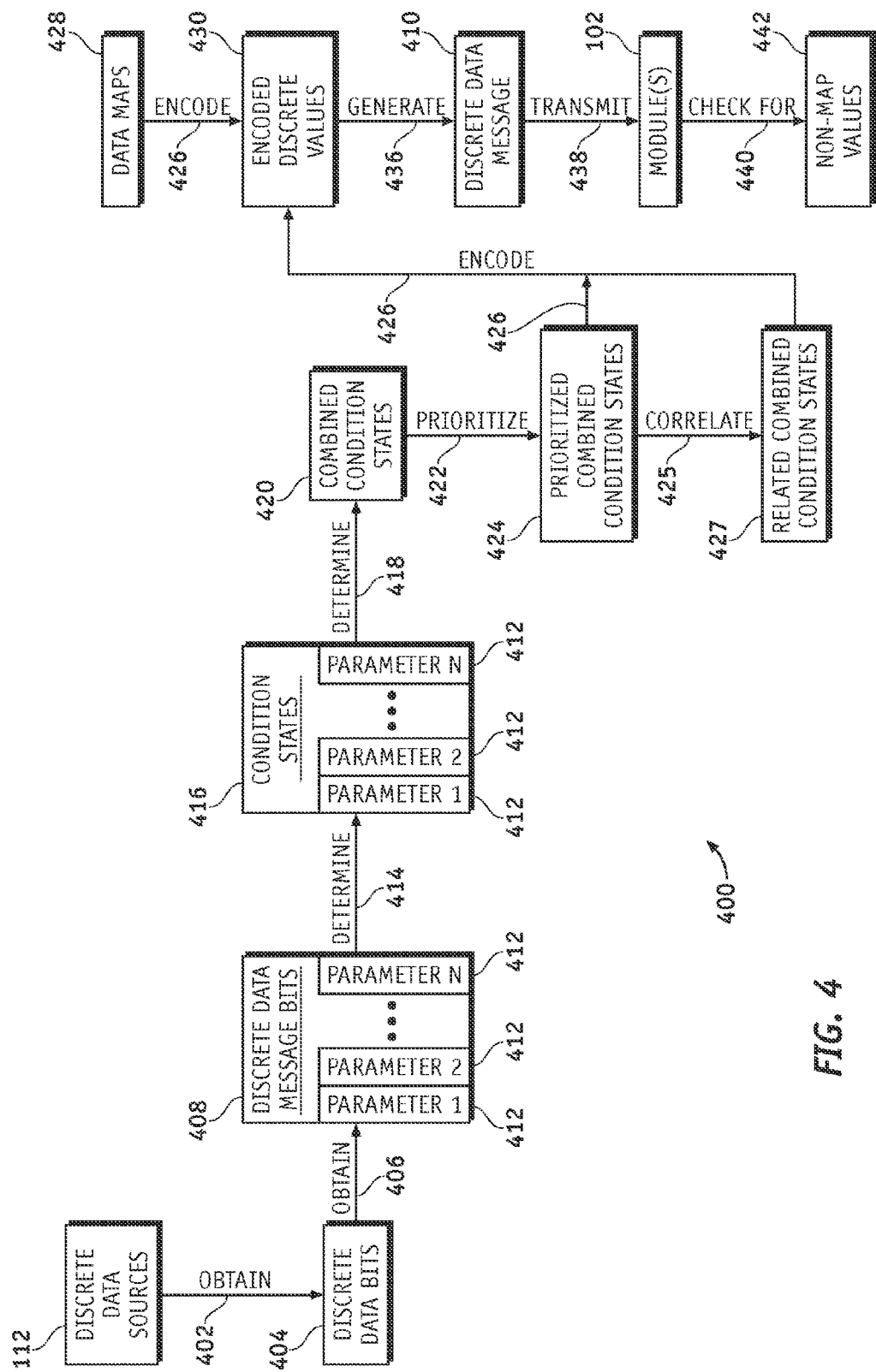
FIG. 4 is a flowchart of an embodiment of a process for securing discrete variable vehicle operational variable data that can be used in the process of FIG. 2.

Turning now to FIG. 4, the discrete variable process 400 begins with step 402, in which a plurality of discrete data bits 404 are obtained, preferably by the receivers 106 from the discrete variable data sources 112. The discrete data bits 404 represent values of various parameters 412 pertaining to vehicle operation, for example whether one or more yaw sensors, lateral acceleration sensors, longitudinal acceleration sensors, and/or other devices or systems are available, whether such devices or systems are operating correctly, and/or various other condition states pertaining to such devices or systems.

Next, in step 406, the processors 108 select a plurality of discrete data message bits 408 from the discrete data bits 404 for ultimate inclusion in one or more discrete data messages 410. For example, in step 406, certain discrete data bits 404 representing parameters or condition states of particular importance to the operation of the vehicle are selected as discrete data message bits 408, while certain other discrete data bits 404 not representing parameters or condition states of particular importance to the operation of the vehicle may not be selected as discrete data message bits 408. In certain embodiments, all of the discrete data bits 404 may be selected as discrete data message bits 408.

Next, in step 414, the processors 108 determine various condition states 416 of the parameters 412 represented in the discrete data message bits 408. Preferably, in step 414 the processors 108 determine at least one condition state 416 for each parameter 412, but this may not be necessary in certain situations. After the condition states 416 are determined, they are used in step 418 by the processors 108 in generating various combined condition states 420. Each combined condition state 420 represents a combination of condition states 416 from different parameters 412. For example, if one condition state 416 for a first yaw rate parameter 412 is that the first yaw rate is available, and a second condition state 416 for a second yaw rate parameter 412 is that the second yaw rate is available, then a combined condition state 420 for this combination of parameters 412 may be that both the first and second yaw rates are available. It will be appreciated that such parameters 412, condition states 416, and combined condition states 420 can take various different forms.

The combined condition states 420 are then prioritized by the processors 108 in step 422, thereby generating a plurality of prioritized combined condition states 424. Preferably the combined condition states 420 are prioritized in terms of their respective importance to vehicle operation, the frequency in which they are likely to occur, and/or the relative importance of correctly identifying each such combined condition state 420. For example, if the combined condition states 420 include whether various combinations of first and second yaw rate parameters 412 are valid, as shown in FIG. 6A (discussed further below), then the highest priority may be given to a combined condition state 420 in which both yaw rates are valid, followed next in priority by a combined condition state 420 in which the first yaw rate is valid and the second yaw rate is invalid, following next in priority by a combined condition state 420 in which the first yaw rate is invalid and the second yaw rate is valid, followed next in priority by a combined condition state 420 in which both yaw rates are invalid. However, it will be appreciated that various prioritization strategies can be used in connection with different combined condition states 420 for different combinations of parameters 412.

The processors 108 then encode, in step 426, the prioritized combined condition states 424 using one or more data maps 428, thereby generating a plurality of encoded discrete values 430. Similar to the continuous variable process 300, preferably each of the encoded discrete values 430 include a sequence of binary digits, so that the possible sequences of binary digits for a particular data map 428 are at least two bit errors removed from one another. In addition, step 426 is preferably conducted using a plurality of Karnaugh maps, such as those depicted in FIGS. 5A-5E and discussed above in connection with the continuous variable process 300. The above-mentioned FIG. 6A, along with FIG. 6B, depict exemplary implementations of one such Karnaugh map (namely, data map 318(B)(2) of FIG. 5B) in the discrete variable process 400, as will be discussed in greater detail further below. However, it will be appreciated that any of the Karnaugh maps of FIGS. 5A-5E, or various other data maps, or combinations thereof, can also be used in implementing the discrete variable process 400.

Returning now to FIG. 4, the encoded discrete values 430 represent an assignment in step 426 of a sequence of encoded sequential binary digits for each prioritized combined condition state 424, based at least in part on (i) the prioritization of each combined condition state 420 in step 422 and (ii) a prioritization of map values of the data maps 428. The prioritization of the map values of the data maps 428 is preferably conducted according to bit adjacencies in the map values, wherein bit adjacencies are defined by contiguous bits within one of the map values that each exhibit a common bit value. Most preferably, the prioritization of the map values also includes sorting the map values primarily according to the size of bit adjacencies, and secondarily according to the frequency of bit adjacencies. The prioritization of the map values may use techniques such as these, and/or other prioritization techniques, for example as shown in the co-pending, commonly-assigned U.S. patent application Ser. No. 11/201, 863, entitled "Method and System for Prioritizing Data Values for Robust Data Representation" (Kerfegar), hereby incorporated by reference in its entirety.

For example, in the above-mentioned example of FIG. 6A with first and second yaw rate parameters 412, the combined condition state 420 with the highest priority (namely, both yaw rates being valid) is assigned an encoded discrete value 430 of five, or 101 in binary form, which has no bit adjacencies and is therefore least susceptible to memory fault errors. The combined condition states 420 with the next highest priorities (namely, in which (i) the first yaw rate is valid and the second yaw rate is invalid and (ii) the first yaw rate is invalid and the second yaw rate is valid) are assigned encoded discrete values 430 of six (110 in binary form) and three (011 in binary form), respectively, each having a bit adjacency that is two bits long (namely, the bit sequence "11"). Finally, the combined condition state 420 with the lowest priority (namely, in which both yaw rates are invalid) is assigned an encoded discrete value 430 of zero (000 in binary form), which has a bit adjacency that is three bits long (namely, the bit sequence "000").

As depicted in FIG. 4, the encoded discrete values 430 may also be dependent upon whether certain combined condition states 420 for different combinations of parameters 412 are related. Specifically, in step 425 the prioritized combined condition states 424 are correlated into one or more pairs of related combined condition states 427 of interest for different combinations of parameters 412, which may then be encoded in step 426 using different values from the data map 428, in order to detect when bits are stuck on particular values.

For example, as illustrated in FIG. 6B, the same data map 428 from FIG. 6A can be used to encode a second group of combined condition states 420 for two new parameters 412 (namely first yaw rate availability and second yaw rate availability), at least some of which are related to the above-described first group of combined condition states 420 for the two parameters 412 previously discussed in connection with FIG. 6A (namely first yaw rate validity and second yaw rate validity). In this example, one pair of related combined condition states 427 of particular interest to vehicle operation includes (i) the combined condition state 420 of the first group (FIG. 6A) in which the first yaw rate is invalid and the second yaw rate is valid, and (ii) the combined condition state 420 of the second group (FIG. 6B) in which the first yaw rate is temporarily unavailable and the second yaw rate is available. A second pair of related combined condition states 427 of interest includes (i) the combined condition state 420 of the first group (FIG. 6A) in which the first yaw rate is valid and the second yaw rate is invalid, and (ii) the combined condition state 420 of the second group (FIG. 6B) in which the first yaw rate is available and the second yaw rate is temporarily unavailable.

As shown in FIGS. 6A and 6B, each related combined condition state 427 in such a pair is assigned a different encoded discrete value 430 using the same data set 428. Also as shown in FIGS. 6A and 6B, where multiple pairs of related combined condition states 427 are identified, assigned values from the same data map 428 may be flipped in the respective pairs. Specifically, in the first pair of related combined condition states 427 from FIGS. 6A and 6B noted above, (i) the combined condition state 420 in which the first yaw rate is invalid and the second yaw rate is valid is assigned a three-bit value of three (011 in binary form), and (ii) the combined condition state 420 in which the first yaw rate is temporarily unavailable and the second yaw rate is available is assigned a three-bit value of six (110 in binary form). Conversely, in the second pair of related combined condition states 427 from FIGS. 6A and 6B noted above, (i) the combined condition state 420 in which the first yaw rate is valid and the second yaw rate is invalid is assigned a three-bit value of six (110 in binary form), and (ii) the combined condition state 420 in which the first yaw rate is available and the second yaw rate is temporarily unavailable is assigned a three-bit value of three (011 in binary form). Accordingly, this can facilitate detection as to whether one of these related combined condition states 427 have changed in value, or whether there has been a memory fault error affecting such values.

Returning again to FIG. 4, in step 436, the discrete data messages 410 are generated using the encoded discrete values 430. Accordingly, each discrete data message 410 includes encoded information regarding the various condition states 416, through the use of the combined condition states 420, with a potential reduction in the number of messages and/or message size. In addition, through the use of the prioritized combined condition states 424, the related combined condition states 427, and the data maps 428, the discrete data messages 410 provide added security against memory fault errors.

The discrete data message 410 is then transmitted in step 438 to the modules 102, preferably for operation of such modules 102. After transmission of the discrete data message 410, the modules 102 may, in step 440, generate a list of non-map values 442 representing numbers that are not valid encoded discrete values 430 from any of the data maps 428, and may check the values in the discrete data message 410 for any such non-map values 442. For example, in the implementations of FIGS. 6A and 6B, the non-map values 442 include the numbers one, two, four, and seven, with three-digit binary representations of 001, 010, 100, and 111, respectively. Accordingly, if any of these non-map values 442 are detected in step 440, this would indicate that there may be a potential error in the transmission of the discrete data message 410. It will be appreciated that various other different types of cross-checks may also be used.

It will also be appreciated that various steps of the discrete variable process 400 may vary from those depicted in FIG. 4 and described above. Similarly, various steps of the discrete variable process 400 may be conducted simultaneously or in a different order than depicted in FIG. 4 and, as alluded to above, various steps of the discrete variable process 400 may be conducted simultaneously and/or in conjunction with various steps of the continuous variable process 300.

The vehicle control system 100 and the combined process 200, the continuous variable process 300, and the discrete variable process 400 are potentially advantageous by reducing the size and/or number of messages transmitted in the vehicle control system 100, thereby reducing traffic and the likelihood of data collisions or other possible problems in the vehicle control system 100, while still achieving enhanced security for variables requiring such enhanced security. It will be appreciated that the combined process 200, the continuous variable process 300, the discrete variable process 400, and various components and/or combinations thereof, may also be utilized in connection with various different types of systems, sub-systems, or devices.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method of providing secure data from vehicle operational variable data that includes a plurality of data message bits, the method comprising the steps of:
   dividing the plurality of data message bits into a first group of data message bits and a second group of data message bits;
   encoding the first group of data message bits using a data map to generate a plurality of encoded data message bits; and
   generating a data message from the plurality of encoded data message bits and the second group of data message bits.

2. The method of claim 1, further comprising the step of:
   selecting the plurality of data message bits from a larger plurality of data bits, based at least in part on the relative importance to vehicle operation.

3. The method of claim 1, wherein the number of encoded data message bits exceeds the number of data message bits in the first group by one bit.

4. The method of claim 1, wherein the data map is a Karnaugh map.

5. The method of claim 1, wherein the data map includes a plurality of possible sequences for the encoded data message bits, the plurality of possible sequences being at least two bit errors removed from one another.

6. The method of claim 1, wherein the step of generating the data message further comprises concatenating the plurality of encoded data message bits and the second group of data message bits.

7. The method of claim 1, further comprising the step of:
   generating a time stamp for the data message;
   wherein the data message is generated also from the time stamp.

8. The method of claim 1, further comprising the step of:
   transmitting the data message.

9. The method of claim 8, further comprising the step of:
   generating a pre-transmittal cross-check measure for the data message before the transmittal of the data message.

10. The method of claim 9, further comprising the steps of:
    generating a post-transmittal cross-check measure for the data message after the transmittal of the data message; and
    comparing the post-transmittal cross-check measure with the pre-transmittal cross-check measure.

11. A method of providing secure data from vehicle operational variable data including a plurality of data bits, the method comprising the steps of:
    selecting a portion of the plurality of data bits to be included in a data message as data message bits, based at least in part on the relative importance of the data bits to vehicle operation;
    dividing the data message bits into a first group of data message bits and a second group of data message bits;
    encoding the first group of data message bits using a Karnaugh map to generate a plurality of encoded data message bits, the Karnaugh map including a plurality of possible sequences for the encoded data message bits, the plurality of possible sequences being at least two bit errors removed from one another; and
    generating the data message from the plurality of encoded data message bits and the second group of data message bits.

12. The method of claim 11, wherein the number of encoded data message bits exceeds the number of data message bits in the first group by one bit.

13. The method of claim 12, further comprising the step of: transmitting the data message.

14. The method of claim 13, further comprising the steps of:
    generating a pre-transmittal cross-check measure for the data message before transmitting the data message;
    generating a post-transmittal cross-check measure for the data message after transmitting the data message; and
    comparing the post-transmittal cross-check measure with the pre-transmittal cross-check measure.

15. A vehicle control system comprising:
    a receiver configured to receive a plurality of data bits of vehicle operational data from a data source; and
    a processor in operable communication with the receiver, the processor configured to:
       select a plurality of data message bits from the plurality of data bits for inclusion in a data message;
       divide the data message bits into a first group of data message bits and a second group of data message bits;
       encode the first group of data message bits using a data map to generate a plurality of encoded data message bits; and
       generate the data message from the plurality of encoded data message bits and the second group of data message bits.

16. The vehicle control system of claim 15, wherein the processor is further configured to:
    generate a time stamp for the data message; and
    generate the data message also from the time stamp.

17. The vehicle control system of claim 15, wherein the data map is a Karnaugh map.

18. The vehicle control system of claim 15, wherein the processor is further configured to encode the first group of data message bits such that the number of encoded data message bits exceeds the number of data message bits in the first group by one bit.

19. The vehicle control system of claim 15, wherein the data map includes a plurality of possible sequences for the encoded data message bits, the plurality of possible sequences being at least two bit errors removed from one another.

20. The vehicle control system of claim 15, wherein the processor is further configured to:
    generate a pre-transmittal cross-check measure for the data message; and
    transmit the data message.

21. A vehicle control system comprising:
    a receiver configured to receive a plurality of groups of data message bits, each group of data message bits corresponding to a vehicle parameter; and
    a processor in operable communication with the receiver, the processor configured to:
       determine a condition state for each vehicle parameter, based at least in part on the corresponding group of data message bits for such vehicle parameter;
       determine a combined condition state for two or more of the vehicle parameters, based at least in part on the determined condition states for such vehicle parameters;
       assign an encoded value for each combined condition state, based at least in part on a data map; and
       generate a data message, based at least in part on the encoded values.

22. The vehicle control system of claim 21, wherein the data map includes a plurality of possible binary digit sequences for the encoded value, the plurality of possible binary digit sequences being at least two bit errors removed from one another.

23. The vehicle control system of claim 21, wherein the processor is further configured to:
  prioritize the combined condition states;
  prioritize map values of the data map according to bit adjacencies, wherein bit adjacencies are defined by contiguous bits within one of the map values that each exhibit a common bit value; and
  assign the encoded values based at least in part on the prioritization of the combined condition states and the prioritization of the map values of the data map.

24. The vehicle control system of claim 23, wherein the processor is further configured to:
  sort the map values primarily according to the size of bit adjacencies, and secondarily according to the frequency of bit adjacencies; and
  assign the encoded values based also at least in part on the sorting of the map values.

25. The vehicle control system of claim 21, wherein the processor is further configured to:
  determine a pair of related combined condition states for different vehicle parameter combinations; and
  assign different encoded values to the related combined condition states in the pair.

26. The vehicle control system of claim 21, wherein the processor is further configured to transmit the data message.

27. The vehicle control system of claim 21, wherein:
  the receiver is further configured to receive a plurality of continuous data message bits representative of a continuous variable; and
  the processor is further configured to:
    divide the plurality of continuous data message bits into a first group of continuous data message bits and a second group of continuous data message bits;
    encode the first group of continuous data message bits using a continuous variable data map to generate a plurality of encoded continuous data message bits; and
    generate the data message also using the plurality of encoded continuous data message bits and the second group of continuous data message bits.

\* \* \* \* \*